US006972900B2

(12) United States Patent
Sander

(10) Patent No.: US 6,972,900 B2
(45) Date of Patent: Dec. 6, 2005

(54) MICROSCOPE, PARTICULARLY A STEREOMICROSCOPE

(75) Inventor: Ulrich Sander, Rebstein (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 0 days.

(21) Appl. No.: 10/803,402

(22) Filed: Mar. 18, 2004

(65) Prior Publication Data

US 2004/0184141 A1    Sep. 23, 2004

(30) Foreign Application Priority Data

Mar. 20, 2003  (DE) ............................... 103 12 471

(51) Int. Cl.[7] ......................... G02B 21/18; G02B 21/00
(52) U.S. Cl. ...................... 359/372; 359/368; 359/431
(58) Field of Search .............................. 359/362–363, 359/368–390, 431, 831; 351/200–247

(56) References Cited

U.S. PATENT DOCUMENTS

| | | | | |
|---|---|---|---|---|
| 4,802,749 A | * | 2/1989 | Togino et al. | ............... 359/377 |
| 6,097,538 A | * | 8/2000 | Watanabe et al. | ........... 359/390 |
| 6,473,229 B2 | * | 10/2002 | Nakamura | ................... 359/377 |
| 6,624,931 B2 | * | 9/2003 | Katsumata et al. | .......... 359/368 |
| 2001/0010592 A1 | | 8/2001 | Nakamura | ................... 359/376 |

FOREIGN PATENT DOCUMENTS

| | | | | |
|---|---|---|---|---|
| DE | 43 36 715 C2 | | 4/1994 | |
| DE | 100 50 351 | * | 5/2001 | ................. 359/831 |
| EP | 0 791 339 A1 | | 8/1997 | |
| JP | 63-167318 | * | 7/1988 | ................. 359/376 |

* cited by examiner

*Primary Examiner*—Thong Q Nguyen
(74) *Attorney, Agent, or Firm*—Hodgson Russ LLP

(57) ABSTRACT

Microscope, particularly a stereomicroscope, for simultaneous observation by a first and a second observer, comprising a main objective (2) defining an optical axis (2a) and an optical beam path (17) following a direction of the optical axis (2a); a magnification system (12, 13) mounted after the main objective (2); a beam splitter device (5) mounted after the main objective (2) for deflecting a first partial optical beam path (17a) into a first plane (I) of the microscope, and for transmitting a second partial optical beam path (17b) in the direction of the optical axis (2a); a plurality of deflector elements (6a, 6b) for deflecting the first partial optical beam path (17a) out of the first plane (I) and into a second plane (II) of the microscope extending substantially parallel to the first plane (I); and a further deflector element (6c) for deflecting the second partial optical beam path (17b) into a third plane (III) of the microscope extending substantially parallel to the first and second planes (I, II) and located above the first and second planes (I, II).

15 Claims, 3 Drawing Sheets

MICROSCOPE, PARTICULARLY A STEREOMICROSCOPE

CROSS-REFERENCE TO RELATED APPLICATIONS

This application claims priority of the German patent application 103 12 471.3 filed Mar. 20, 2003 which is incorporated by reference herein.

BACKGROUND OF THE INVENTION

The present invention relates to a microscope, particularly a stereomicroscope, for simultaneous observation of an object by first and second observers.

Operating microscopes used in ophthalmology make it possible for both a main operator and an assistant to view the same operating area.

An ophthalmological operating microscope of this kind is known for example from DE 43 31 635 C2. The operating microscope described therein has binocular tubes for the main observer and a second observer as well as a beam splitter which divides the object light between the main observer and second observer. A disadvantage of this microscope is that it is relatively tall in construction as the complete magnification optical means for the main observer are arranged substantially vertically.

In neurosurgery, too, new operating techniques require both the main operator and the assistant to have the same view of an area being operated on.

An essential requirement of current operating microscopes is that their overall height must be kept to a minimum for ergonomic reasons. In addition, the assistant's viewer must be able to be pivoted from the right to the left hand side of the microscope (or vice versa) quickly and with no adaptation required, and neither the image quality nor the overall height should be negatively affected by any accessories which are required only for certain operating techniques. Also, both the main observer and the assistant should have the opportunity to observe the so-called red reflex to the same degree. In addition, the free working interval, i.e. the area between the object and the objective, should not be reduced by components. In microscopes used in neurosurgery it is particularly advantageous if the assistant's microscope can be positioned in every spatial direction relative to the direction of view of the main operator.

In conventional microscopes these requirements are only partly met.

The microscope M840/M841 of the present Applicant, for example, as described in the brochure "Leica M841 EBS", published November 2001, ensures that the assistant and main operator actually have the same field of vision.

This is achieved by mounting the assistant's viewing device above the magnification system and using, as the magnification system, a zoom system which is made up of four identical monoscopic magnification systems. Two of the four parallel systems make up the stereoscopic magnification system for the main observer. Further systems or channels located perpendicularly on the connecting axis of these systems provide the stereoscopic magnification system for the assistant.

U.S. 2001/001 05 92 A1 discloses a microscope which can be used in neurosurgery, which comprises an objective system, a zoom system and an eyepiece system. The objective system is mounted substantially vertically, while the zoom system consisting of two individual systems or optical channels is mounted horizontally. The axis of the zoom system is located perpendicularly to the axis of the main objective. As mentioned, the zoom system in turn consists of two identical magnification channels the axes of which extend parallel to each other, thereby ensuring stereoscopic viewing of an object by the main observer. One disadvantage of the microscope described therein is that the separation of the assistant's optical path underneath the main objective substantially reduces the free working interval. Moreover, the optical components used incur some considerable expense, as the main operator and assistant require two separate main objectives.

SUMMARY OF THE INVENTION

The aim of the present invention is to provide a microscope, particularly a stereomicroscope, which allows simultaneous observation by a first and second observer, which is as low as possible and has the largest possible free working interval while at the same time being easy to handle.

This aim is achieved with a microscope, particularly a stereomicroscope, generally comprising a main objective defining an optical axis and an optical beam path following a direction of the optical axis; a magnification system mounted after the main objective; a beam splitter device mounted after the main objective for deflecting a first partial optical beam path into a first plane of the microscope, and for transmitting a second partial optical beam path in the direction of the optical axis; a plurality of deflector elements for deflecting the first partial optical beam path out of the first plane and into a second plane of the microscope extending substantially parallel to the first plane; and a further deflector element for deflecting the second partial optical beam path into a third plane of the microscope extending substantially parallel to the first and second planes and located above the first and second planes.

Thanks to the beam splitter device arranged after the common main objective for the first and second observer, i.e. the arrangement of the beam splitter device within the microscope body between the main objective and the magnification system, the free working interval between the main objective and the object to be observed is unaffected. As a result of the deflection, according to the invention, of the observation beam or beam path passing through the main objective in planes which extend at an angle, particularly perpendicularly, with respect to the optical axis of the main objective, the overall height of the microscope according to the invention can be reduced by comparison with conventional solutions.

Advantageous embodiments of the microscope according to the invention are the subject of the subsidiary claims.

According to a first preferred embodiment of the invention the beam splitter device is constructed as a geometric beam splitter. When a beam splitter of this kind is used the loss of light caused by absorption is particularly low.

Advantageously, the beam splitter device, which may be in the form of a plate, for example, comprises at least one reflecting area and at least one transmitting area. A beam splitter device of this kind is cheap and easy to manufacture and when suitably arranged at an angle to the optical path acting upon it ensures that this optical beam path is divided into partial optical beam paths in the desired manner. This also makes it easy to define the fixing of pairs of stereoscopic beams.

According to another preferred embodiment of the microscope according to the invention the beam splitter device is constructed as a physical beam splitter. With this kind of beam splitting the cross section of a light beam or optical beam path passing through the beam splitter device remains unchanged, i.e. the division of the optical beam path into partial optical beam paths takes place uniformly over the entire cross section of the beam splitter device.

Preferably, the first, second and third planes of the microscope are aligned substantially horizontally. Particularly in conjunction with a vertically extending optical axis of the main objective it is thus possible to minimise the overall height of the microscope.

According to a preferred embodiment of the invention the magnification system comprises a first zoom system for the first observer, provided in the first or second plane of the microscope, and a second zoom system for the second observer, provided in the third plane. Thanks to this separate arrangement of the zoom systems it is possible to provide the main operator and assistant with zoom systems having different magnifications. In addition, different magnifications can be set, for example, with the same or similar zoom systems for the main operator and assistant. This arrangement of the zoom system for the second observer or assistant also provides a locally variable setting of the assistant's microscope or assistant's viewer relative to the main operator.

Conveniently, the first and second zoom system each have at least two magnification or observation channels. This means that stereoscopic viewing can be provided for both the main operator and the assistant. It is also feasible to equip the zoom systems with at least one other magnification or observation channel to which a video camera can be attached for documentation purposes, for example. Appropriately, when using a geometric beam splitter, the transmitting and reflecting regions of the beam splitter are tuned to the magnification or observation channels of the zoom systems.

Preferably, the deflecting device for deflecting the partial optical beam path into the third plane is made rotatable about the optical axis of the main objective. This enables the viewing direction for the second observer to be easily rotatable relative to the first observer. Particularly when using a physical beam splitter to produce the two partial optical beam paths it is possible to rotate the partial optical beam path for the second observer in the third plane substantially through 360°, as no stereoscopic splitting of the partial optical beam path has yet taken place at the site of the deflecting device for deflecting the partial optical beam path into the third plane. It should be noted that even when a geometric beam splitter is used it is advisable for the deflecting device for deflecting the partial optical beam path into the third plane to be rotatable, as even when stereoscopic splitting has already taken place pivoting within specified limits with regard to preferred positions of the assistant's microscope still ensures that the assistant has a satisfactory view. Preferred positions are, in particular, those in which stereoscopic beams of the assistant's partial optical beam path strike the deflector element at the same height, i.e. substantially horizontally, so that it is possible for the assistant to obtain a corresponding horizontal view (without the need to tilt his or her head). These preferred positions are characterised by the same distances to be covered by the stereoscopic partial beams. As a rule, these positions are perpendicular to the direction of viewing of the main operator.

It may also be expedient to construct a binocular tube for the main operator, e.g. in the second plane of the microscope, and/or for the assistant, e.g. in the third plane of the microscope, to be rotatable about the respective optical axis in the plane in question, so that, for example, any tilting of the microscope as a whole or of the assistant's microscope can be equalised.

According to another preferred embodiment of the microscope according to the invention the first partial optical beam path and second partial optical beam path intersect in the region of the point of intersection of the optical axis of the main objective with the second plane of the microscope. The first partial optical beam path extends in the second plane, and the second partial optical beam path extends along the optical axis of the main objective. When the two partial optical beam paths cross or pass through each other substantially perpendicularly in this manner they have no interaction or influence on each other, with the result that the space occupied by the microscope can thus be optimised overall. It is also possible for the two partial optical beam paths to pass each other without crossing or passing through each other.

Conveniently, the microscope according to the invention has deflector elements which can be selectively used and/or pivoted, by means of which the first partial optical beam path can be deflected from the second to the first plane or pivoted about the respective optical axes in the first or second plane. This enables the viewing region for the first observer or main operator to be varied as well.

In another preferred embodiment of the microscope according to the invention a data projecting device is provided between the main objective and the beam splitter device. Using a data projecting device of this kind before the splitting of the optical path into the partial optical beam paths, the projected data can be supplied to the main operator and assistant by means of a single data projection.

According to another preferred embodiment of the microscope according to the invention the illuminating device is positioned on the observer side of the beam splitter device mounted downstream of the main objective. For example, the illuminating device may be provided in the region of the optical axis of the main objective or the optical axis in the first plane of the microscope. For example, in such a case, the beam splitter device could be constructed with other reflecting or transmitting regions which provide illumination of the object to be observed using light from the illuminating device.

It has also proved advantageous to provide electrical and/or mechanical coupling of the main operator's and assistant's zoom systems. This makes it possible in particular to select the same magnifications for the main operator and assistant, with the option of uncoupling the zoom systems if desired.

BRIEF DESCRIPTION OF THE DRAWINGS

The invention will now be described more fully with reference to the accompanying drawings, wherein.

DETAILED DESCRIPTION OF THE INVENTION

Figure 1:
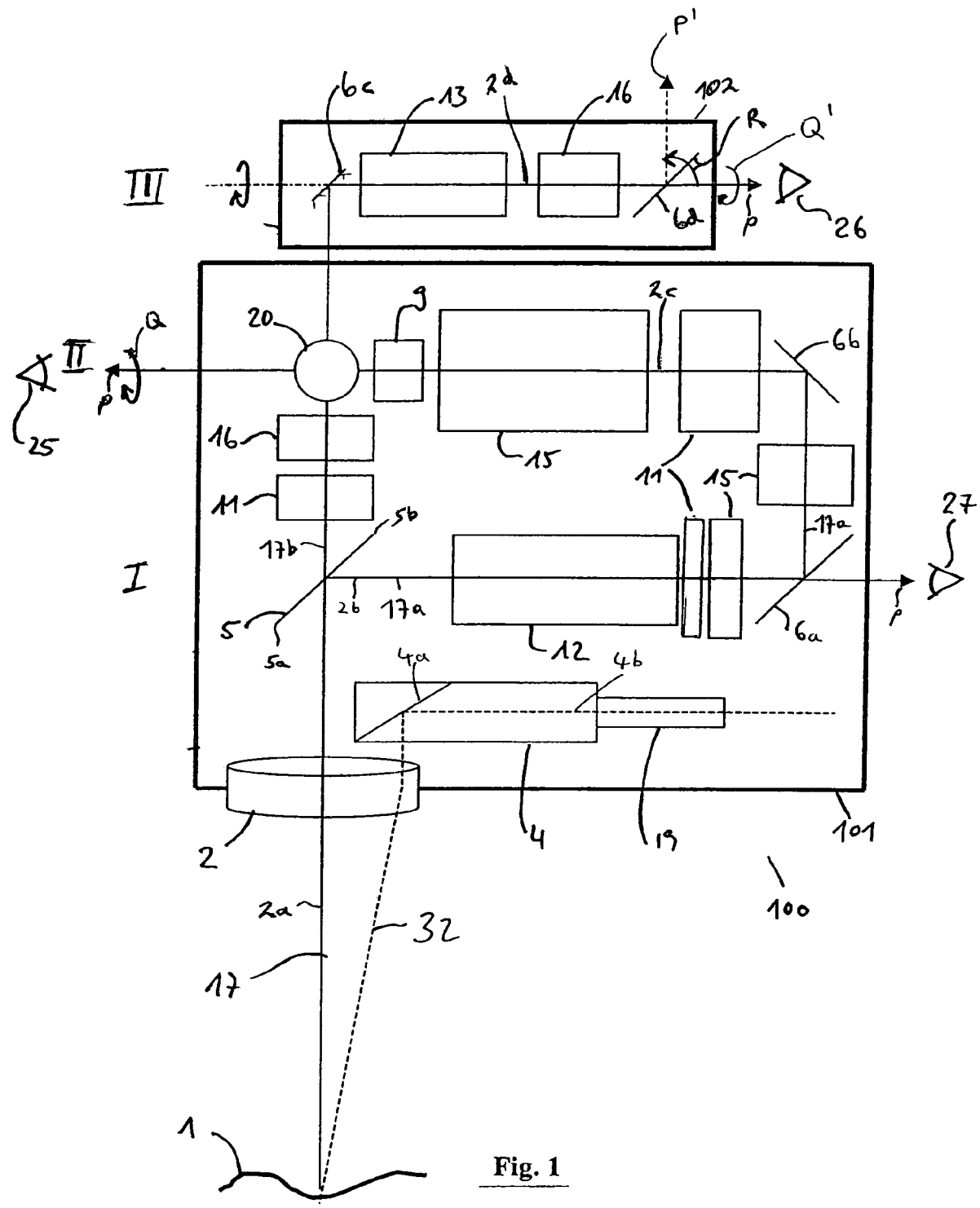
FIG. 1 is a diagrammatic side view of a first preferred embodiment of the microscope according to the invention.

In FIG. 1, a preferred embodiment of a microscope according to the invention in the form of a stereomicroscope is generally designated 100. An object 1 is to be observed using the stereomicroscope shown. The stereomicroscope shown is, in particular, an ophthalmological microscope or a microscope for neurosurgery.

The stereomicroscope 100 shown has a housing 101 in which are accommodated the optical systems for a first observer or main operator, and an assistant's microscope 102.

Reference numeral 4 denotes an illuminating device which directs light supplied through a fibre cable 19 through a deflector element 4a onto the object 1 which is to be observed. The main axis of the illuminating device 4 is designated 4b and its illuminating axis 32.

In the lower part of the microscope housing 101 is provided a main objective 2. The main objective 2 defines an optical axis 2a.

Above the main objective 2 is provided a beam splitter device 5 which splits an optical observation beam path 17 proceeding from the object 1 along the optical axis 2a into a first partial or split optical beam path 17a and a second partial or split optical beam path 17b. It will be appreciated that the optical observation beam path 17 in the orientation of the microscope shown extends substantially vertically and the partial optical beam path 17a extends perpendicularly thereto, i.e. substantially horizontally. The partial optical beam path 17b does not undergo any deflection with respect to the optical observation beam path 17 and thus also extends substantially vertically. It should be noted that the microscope 100 may be constructed to be rotatable in every spatial direction, thus resulting in correspondingly inclined orientations of the optical axis 2a of the main objective.

Partial optical beam path 17a defines an optical axis 2b in a first plane I of the microscope, along which other optical components 11, 12 and 15 are arranged.

Reference numeral 12 denotes a magnification system for the main operator, which is preferably constructed as a zoom system. Additional components, which may also be provided in the first plane I of the microscope, are shown diagrammatically and designated 15. Also provided are intermediate imaging systems, generally designated 11.

A first deflector element provided in the first plane I of the microscope is designated 6a. This serves to deflect the partial optical beam path 17a back into the vertical direction. In a second plane II of the microscope is provided another deflector element 6b which the partial optical beam path 17a strikes after being deflected at 6a, to be deflected back into the horizontal direction. An optical axis defined by the partial optical beam path 17a in the second plane II is designated 2c. Other optical accessories or intermediate imaging systems which may be arranged either between the deflector elements 6a, 6b or along the optical axis 2c are in turn designated 15 and 11, respectively. Mounted after the optical accessories 15 in the second plane II of the microscope, for example, is an optical splitter device 9. After passing through the optical accessories 15 and the optical splitter 9 in the second plane II of the microscope, the partial optical beam path 17a strikes a binocular tube (not shown) for the main operator or first observer. To illustrate the direction of viewing of the main operator, an eye is diagrammatically shown and designated 25. A binocular tube (not shown) for the main operator is expediently rotatable about the optical axis 2c of the second plane II of the microscope, as indicated by the rotary arrow Q. This makes it possible to compensate for inclined positions of the microscope, which are often unavoidable in ophthalmology or neurosurgery, for the main operator, i.e. the main operator is provided with a substantially horizontal view.

Extending vertically upwards, the partial optical beam path 17b transmitted or not deflected by the beam splitter device 5, passes first through an optical intermediate imaging system, in turn designated 11, and other optical accessories 16. In an area of penetration generally designated 20 and represented by a circle in the interests of clarity, the partial optical beam path 17b (or the optical axis 2a) intersects with the second plane II of the microscope. It is preferable if the partial optical beam path 17b also intersects with the optical axis 2c which extends in the second plane II of the microscope. As the horizontally and vertically extending partial optical beam paths 17a, 17b do not mutually influence one another, partial optical beam path 17b then meets another (third) deflector element 6c which is mounted in the assistant's microscope 102. As a result the partial optical beam path 17b is deflected into a third plane III of the microscope, running parallel to planes I and II.

The deflection of the partial optical beam path 17b into the third plane III of the microscope defines a substantially horizontally extending optical axis 2d.

Along the optical axis 2d is provided an assistant's magnification system 13 constructed as a zoom system, in particular, together with additional assistant components, also designated 16. The assistant's view (through a binocular tube not shown in detail) is in the third plane III of the microscope, as illustrated by the eye diagrammatically shown in the drawing (reference numeral 26).

Between the optical accessories 16 and the binocular tube (not shown) for the assistant, another (fourth) deflector element 6d may (optionally) be provided, which can deflect the partial optical beam path 17b out of the third plane III of the microscope. In this way it is possible either for an assistant to view another plane of the microscope or, for example if the deflector element 6d is of semi-transparent construction, for the assistant to view the third plane of the microscope III at 26 while at the same time the image is projected or deflected out, e.g. for documentation purposes. The deflector element 6d may be made pivotable, as illustrated by the rotary arrow R which indicates the angular range over which the beams extending along the optical axis 2d of the third plane III of the microscope can be rotated or deflected. As already mentioned, P denotes the assistant's view of the third plane III of the microscope, this view being rotatable into a viewing direction designated by an arrow P', by rotating the deflector element 6d about an optical axis extending vertically into the plane of the drawing. Expediently, a binocular tube (not shown) for the assistant, which may be attached for example along the optical axis 2d in the direction of the arrow P, is rotatable about the optical axis 2d, as illustrated by the rotary arrow Q'. As already mentioned, these measures compensate for any tilting of the assistant's microscope for the assistant or second observer.

The splitting of the main optical observation beam path 17 passing through the main objective 2 into two pairs of stereoscopic optical beam paths can preferably be done in two ways.

First, it is possible to construct the beam splitter device 5 as a physical beam splitter, e.g. a semi-transparent mirror, so that partial optical beam paths comprising a pencil of rays each strike the magnification system 12 for the main operator or the magnification system 13 for the assistant. Two observation channels can then be provided in these magnification systems 12, 13, by means of which the partial optical beam paths are split stereoscopically. In the view in FIG. 1 the two observation channels of the magnification system 12 are arranged one behind the other at the same height, i.e. parallel to the optical axis 2b in the first plane I of the microscope. In the view in FIG. 1, the optical axis of the two observation channels of the magnification system 12 thus coincide with the optical axis 2b. A corresponding arrangement of the magnification channels can be obtained in the assistant's magnification system 13. With this construction of the beam splitter device 5 and assistant's magnification systems 13 it has proved particularly advantageous if the assistant's microscope 102 is theoretically capable of rotating through 360° about the optical axis without affecting or impairing the assistant's view.

Figure 2:
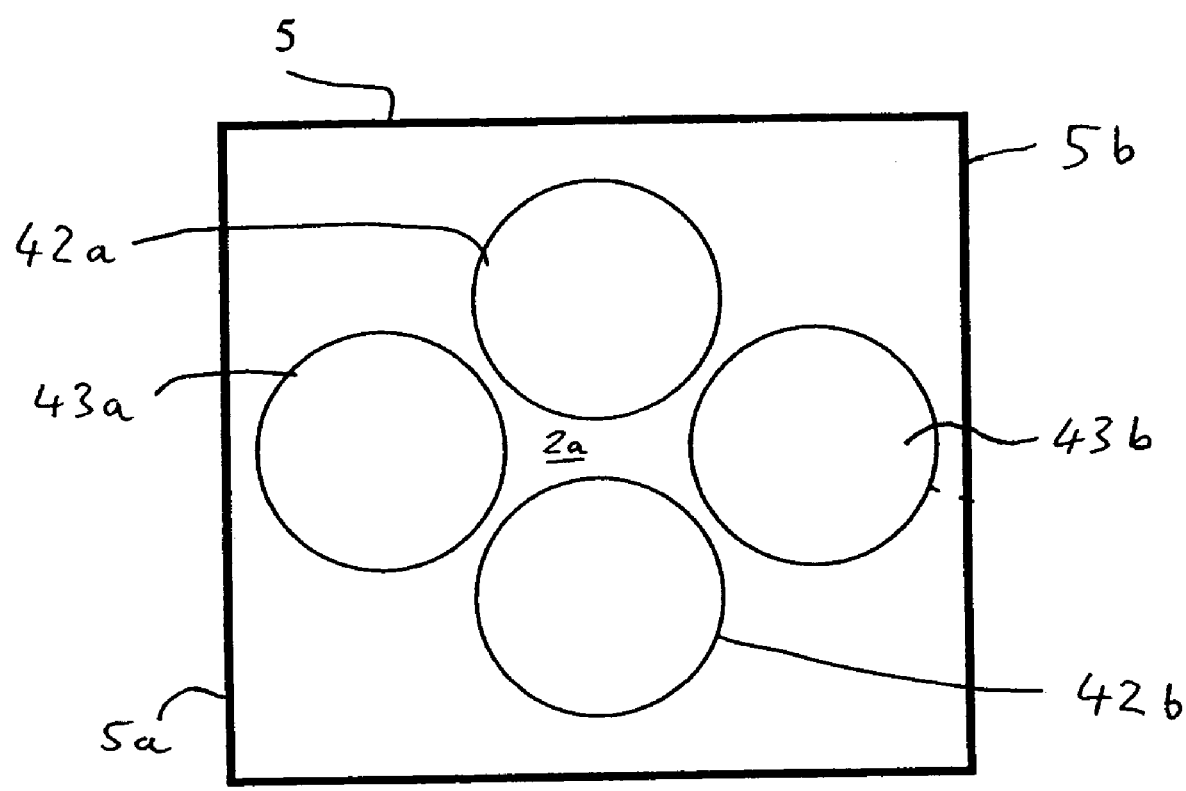
FIG. 2 shows a geometric beam splitter device which is preferably used in the microscope according to the invention for splitting the optical beam path of observation passing through the main objective into partial optical beam paths for the first and second observers.

However, by a special construction of the beam splitter device 5, it is possible to split the optical observation path 17 into partial optical beam paths 17a, 17b, each having their own pairs of optical beam paths, for the main operator and assistant, even before the partial optical beam paths 17a, 17b have entered the magnification systems 12 and 13, respectively. This is illustrated by FIG. 2, which shows another preferred embodiment of the beam splitter device 5. The illustration of the beam splitter device in FIG. 2 represents a projection of this device into a plane perpendicular to the optical axis 2a of the main objective 2. To clarify the position of installation in the microscope 100 the lower edge 5a and upper edge 5b of the beam splitter device 5 are shown both in FIG. 1 and in FIG. 2. The circular areas 42a, 42b are constructed to be fully reflective, so that any light from the optical path 17 striking these areas is deflected and forms the partial optical beam path 17a, which thus comprises two beams parallel to one another. The areas 42a, 42b are aligned so that beams reflected from them strike correspondingly arranged observation channels (not individually shown) in the magnification system 12.

The areas 43a, 43b of the beam splitter device 5, on the other hand, are totally transparent or transmissive, so that light from the optical beam path 17 passing through these areas is converted or split into two parallel beams which form the partial optical beam path 17b.

It should be pointed out that the construction of the beam splitter device 5 with four circularly formed areas 42a, 42b, 43a, 43b is chiefly for reasons of clarity of presentation. It is also possible to construct the beam splitter device 5 in the form of a plate with reflecting or transmitting areas in any desired arrangement, provided that the reflecting or transmitting areas are of such dimensions that the observation channels of the magnification systems 12 or 13 are totally subjected to beams of light.

When using a beam splitter device 5 of this kind the assistant's microscope is expediently pivoted through 90° out of or into the plane of the drawing, with respect to the alignment shown in FIG. 1, so that no path differences result on the deflector element 6c for the parallel beams (which are offset to the right and left, viewed according to FIG. 1, with respect to the optical axis 2a). It has proved advantageous to pivot the assistant's microscope 102 through ±20° about the optical axis 2a, relative to the favoured alignment mentioned above.

The component parts 15 shown may include data projectors, shutters, filters, transparent displays, pupil adjusters, beam deflector systems, image rectifiers, image inverters or similar devices. The optical splitter 9 is preferably used for the attachment of documentation equipment such as a video camera. An optical splitter of this kind may also be found elsewhere in the optical paths shown, e.g. at the locations of components 11, 15 or 16.

As already mentioned, binocular tubes for the main operator and assistant are not shown in FIG. 1. It should be pointed out that in the direction of the arrows shown, the partial optical beam paths 17a, 17b are deflected into binocular tubes with eyepieces (not shown), thereby enabling the main observer 25 or the assistant to gain a binocular stereoscopic view.

The additional optical components 16 in the assistant's microscope 102 may also comprise image rectifiers, intermediate imaging systems, deflector elements, data projection devices, filters, pupil adjusters, image rectifiers, image inverters, etc. If there is no wish or no need for an assistant to observe, the assistant's microscope 102 can be removed. For example, by replacing the beam splitter device 5 shown with a fully reflective deflector element, e.g. a mirror or a prism, the main operator may be provided with all the brightness or light intensity while retaining all the other advantages of the construction shown. The beam splitter device 5 may expediently be removed from the optical path by pivoting or sliding it away, and a fully reflective element may accordingly be brought into the optical path.

Another embodiment of the microscope according to the invention will now be described with reference to FIG. 3. Components already shown in FIG. 1, which are also provided in the embodiment according to FIG. 3, have been given the same reference numerals. There is therefore no need to enter into a separate explanation of these components and their functions.

Figure 3:
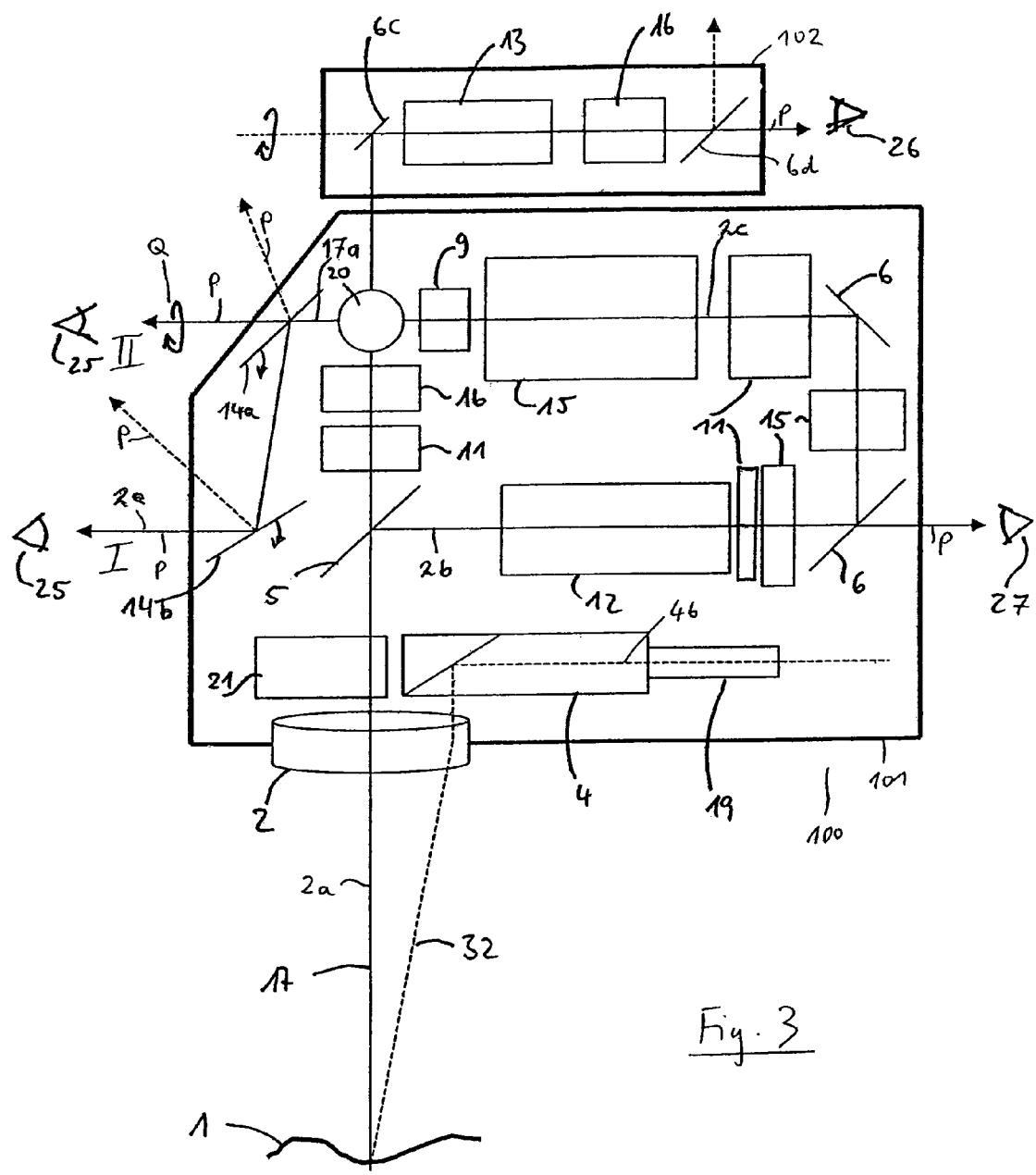
FIG. 3 is a view corresponding to FIG. 1 of a second preferred embodiment of the microscope according to the invention.

The embodiment of the microscope according to the invention shown in FIG. 3 differs essentially from the embodiment in FIG. 1 by the guiding of the partial optical beam path 17a for the main operator behind the area of penetration 20. In the embodiment in FIG. 3 two further deflector elements 14a, 14b are provided here, by means of which the partial optical beam path 17a can be deflected from the second plane II of the microscope back into the first plane I of the microscope. By selectively pivoting the deflector element 14a into or out of the optical path 17a it is thus possible for the main operator to view in the second plane II of the microscope (along the optical axis 2c) or the first plane I of the microscope, e.g. along the extension 2e of the optical axis 2b. It is also possible to construct these deflector elements 14a, 14b to be pivotable about axes perpendicular to the plane of the drawing or to the optical axis 2c and 2e. This also makes it possible for the main operator to have a diagonal view. The deflector elements 14a, 14b may also be semi-transparent in construction, thereby again providing different possible views or projections. Preferred ranges of rotation of the deflector elements 14a, 14b are in turn indicated by the rotary arrows R which indicate the rotatability of the main operator's view between positions P and P'.

If data projection is desired both for the main operator and for the assistant, this has to be provided separately for the main operator and assistant in the embodiment according to FIG. 1. In the embodiment according to FIG. 3 data projection 21 is provided in front of or on the object side of the beam splitter device 5 (i.e. between the main objective 2 and the beam splitter device 5). In this way, both the main operator and the assistant can make use of shared data projection.

While not shown in the figures, first zoom system 12 and second zoom system 13 are preferably coupled to one another electrically and/or mechanically to permit selection of the same magnifications for the main operator and assistant, with the option of uncoupling the zoom systems if independent magnification control is desired.

To optimise the coupling of the illumination, the axis of symmetry or optical axis 2a of the main objective 2 may if necessary be arranged off-centre relative to the optical beam path 17 of observation.

LIST OF REFERENCE NUMERALS 1 object
2 main objective
2a optical axis of main objective
2b optical axis in plane I of microscope
2c optical axis in plane II of microscope
2d optical axis in plane III of microscope
2e extension of the optical axis 2b
4 illuminating device
4a deflector element
4b main axis of illuminating device
5 beam splitter device
6a–6d deflector elements
9 optical splitter device
11 intermediate imaging system
12 magnification system (for main operator)
13 assistant's magnification system
14a, 14b deflector elements
15, 16 optical accessories
17 optical beam path of observation
17a, 17b partial optical beam paths
19 fibre cable
20 area of penetration
21 data projection device
25, 26, 27 eyes or viewing directions
32 illumination axis
42a, 42b reflecting regions of beam splitter device 5
43a, 43b transmitting regions of beam splitter device 5
100 stereomicroscope
101 housing
102 assistant's microscope
I, II, III planes of the microscope
P, P' arrows indicating viewing directions
Q, Q' rotary arrows indicating rotatability
R rotary arrows indicating rotation ranges

What is claimed is:

1. A microscope for simultaneous observation of an object by a first observer and a second observer, the microscope comprising:
   a main objective (2) defining an optical axis (2a) and an optical beam path (17) following a direction of the optical axis (2a);
   a magnification system (12, 13) mounted after the main objective (2);
   a beam splitter device (5) mounted after the main objective (2) for deflecting a first partial optical beam path (17a) of the optical beam path (17) into a first plane (I) of the microscope, and for transmitting a second partial optical beam path (17b) of the optical beam path (17) in the direction of the optical axis (2a);
   a plurality of deflector elements (6a, 6b) for deflecting the first partial optical beam path (17a) out of the first plane (I) and into a second plane (II) of the microscope extending substantially parallel to the first plane (I); and
   a further deflector element (6c) for deflecting the second partial optical beam path (17b) transmitted by the beam splitter device (5) into a third plane (III) of the microscope extending substantially parallel to the first and second planes (I, II) and located above the first and second planes (I, II).

2. The microscope according to claim 1, wherein the beam splitter device (5) is a geometric beam splitter.

3. The microscope according to claim 2, wherein the beam splitter device (5) includes at least one reflective area (42a, 42b) and at least one transmitting area (43a, 43b).

4. The microscope according to claim 1, wherein the beam splitter device (5) is a physical beam splitter.

5. The microscope according to claim 1, wherein the first, second, and third planes (I, II, and III) of the microscope are substantially horizontal.

6. The microscope according to claim 1, wherein the magnification system (12, 13) includes a first zoom system (12) for the first observer provided in the first plane (I) or the second plane (II) of the microscope, and a second zoom system (13) for the second observer provided in the third plane (III) of the microscope.

7. The microscope according to claim 6, wherein each of the first and second zoom systems (12, 13) includes at least two magnification or observation channels.

8. The microscope according to claim 6, wherein the first zoom system (12) and the second zoom system (13) are electrically and/or mechanical coupled to one another.

9. The microscope according to claim 1, wherein the further deflector element (6c) is pivotable about the optical axis (2a).

10. The microscope according to claim 1, wherein the first partial optical beam path (17a) and the second partial optical beam path (17b) intersect in a region (20) of the point of intersection of the optical axis (2a) of the main objective and the second plane (II) of the microscope.

11. The microscope according to claim 1, further comprising a plurality of additional deflector elements (14a, 14b) for deflecting the first partial optical beam path (17a) out of the second plane (II) and into the first plane (I).

12. The microscope according to claim 11, wherein the plurality of additional deflector elements are selectively pivotable to enable adjustment of a viewing angle associated with the first partial optical beam path (17a).

13. The microscope according to claim 1, further comprising a data projection device (21) between the main objective (2) and the beam splitter device (5).

14. The microscope according to claim 1, further comprising optical accessories and/or intermediate imaging systems (11, 15) arranged along the first partial optical beam path (17a).

15. The microscope according to claim 1, further comprising an illuminating device (4) for illuminating the object.

* * * * *